(12) United States Patent
Barnes

(10) Patent No.: US 10,195,736 B2
(45) Date of Patent: Feb. 5, 2019

(54) VARIABLE FORCE EXOSKELETON HIP JOINT

(71) Applicant: Lockheed Martin Corporation, Bethesda, MD (US)

(72) Inventor: Gavin A. Barnes, St. Cloud, FL (US)

(73) Assignee: Lockheed Martin Corporation, Bethesda, MD (US)

( * ) Notice: Subject to any disclaimer, the term of this patent is extended or adjusted under 35 U.S.C. 154(b) by 635 days.

(21) Appl. No.: 14/801,941

(22) Filed: Jul. 17, 2015

(65) Prior Publication Data

US 2017/0014993 A1 Jan. 19, 2017

(51) Int. Cl.
*A61H 3/00* (2006.01)
*B25J 9/00* (2006.01)
*B25J 19/00* (2006.01)

(52) U.S. Cl.
CPC .......... *B25J 9/0006* (2013.01); *B25J 19/0016* (2013.01)

(58) Field of Classification Search
CPC .......... B25J 9/0006; A61H 3/00; A61H 3/008; A61H 2201/165
See application file for complete search history.

(56) References Cited

U.S. PATENT DOCUMENTS

| | | |
|---|---|---|
| 2,010,482 A | 8/1935 | Cobb |
| 3,964,182 A | 6/1976 | Pomeret et al. |
| 4,258,556 A | 3/1981 | Ruyten et al. |
| 5,016,869 A | 5/1991 | Dick et al. |
| 5,020,790 A | 6/1991 | Beard et al. |
| 5,054,476 A | 10/1991 | Petrofsky et al. |
| 5,865,426 A | 2/1999 | Kazerooni |
| 5,993,404 A | 11/1999 | McNiel |
| 6,886,812 B2 | 5/2005 | Kazerooni |
| 6,913,583 B2 | 7/2005 | Jestrabek-Hart |

(Continued)

FOREIGN PATENT DOCUMENTS

| | | |
|---|---|---|
| JP | H03105191 U | 10/1991 |
| JP | 3024978 U | 6/1996 |

(Continued)

OTHER PUBLICATIONS

Decision to Grant for Japanese Patent Application No. 2013-504019, dated Aug. 16, 2016, 6 pages.

(Continued)

*Primary Examiner* — Daniel J Wiley
(74) *Attorney, Agent, or Firm* — Withrow & Terranova, PLLC

(57) ABSTRACT

An adjustable force exoskeleton hip joint system. The system includes a hip joint that includes a rotation axis, and a first member that is rotatable about the rotation axis. The first member has a lower body connection location configured to be coupled to a lower body link. The hip joint further includes a second member rotatable about the rotation axis and having an upper body connection location configured to be coupled to an upper body link. The system includes an adjustable force mechanism coupled to at least one member of the first member and the second member and configured to apply an adjustable force to the at least one member to hinder rotation of the upper body connection location with respect to the lower body connection location in a rotational direction.

23 Claims, 8 Drawing Sheets

(56) References Cited

U.S. PATENT DOCUMENTS

| | | | |
|---|---|---|---|
| 7,153,242 B2 | 12/2006 | Goffer | |
| 7,163,518 B1 | 1/2007 | Roche et al. | |
| 7,571,839 B2 | 8/2009 | Chu et al. | |
| 7,628,766 B1 | 12/2009 | Kazerooni et al. | |
| 7,883,546 B2 | 2/2011 | Kazerooni et al. | |
| 7,947,004 B2 | 5/2011 | Kazerooni et al. | |
| 8,057,410 B2 | 11/2011 | Angold et al. | |
| 8,070,700 B2 | 12/2011 | Kazerooni et al. | |
| 8,171,570 B2 | 5/2012 | Adarraga | |
| 8,231,688 B2 | 7/2012 | Fairbanks et al. | |
| 8,257,291 B2 | 9/2012 | Kazerooni et al. | |
| 8,394,038 B2 | 3/2013 | Ashihara et al. | |
| 8,672,865 B2 | 3/2014 | Franke et al. | |
| 8,702,632 B2 | 4/2014 | Han et al. | |
| 8,801,641 B2 | 8/2014 | Kazerooni et al. | |
| 8,894,592 B2 | 11/2014 | Amundson et al. | |
| 8,945,028 B2 | 2/2015 | Kazerooni et al. | |
| 8,968,222 B2 | 3/2015 | Kazerooni et al. | |
| 9,011,354 B2 | 4/2015 | Angold et al. | |
| 9,492,300 B2 | 11/2016 | Bujold et al. | |
| 9,662,262 B2* | 5/2017 | Hollander | A61H 3/00 |
| 2003/0073552 A1 | 4/2003 | Knight | |
| 2003/0109817 A1 | 6/2003 | Berl | |
| 2003/0115954 A1 | 6/2003 | Zemlyakov et al. | |
| 2004/0237351 A1 | 12/2004 | Howell | |
| 2005/0137717 A1 | 6/2005 | Gramnas et al. | |
| 2006/0064047 A1* | 3/2006 | Shimada | A61F 5/0102 602/23 |
| 2006/0107433 A1 | 5/2006 | Olson | |
| 2006/0260620 A1 | 11/2006 | Kazerooni et al. | |
| 2007/0056592 A1 | 3/2007 | Angold et al. | |
| 2007/0123997 A1 | 5/2007 | Herr et al. | |
| 2007/0233279 A1 | 10/2007 | Kazerooni et al. | |
| 2008/0234608 A1 | 9/2008 | Sankai | |
| 2009/0210093 A1 | 8/2009 | Jacobsen et al. | |
| 2009/0292369 A1* | 11/2009 | Kazerooni | B25J 9/0006 623/27 |
| 2010/0076360 A1* | 3/2010 | Shimada | A61B 5/1038 602/23 |
| 2010/0094185 A1 | 4/2010 | Amundson et al. | |
| 2010/0152630 A1* | 6/2010 | Matsuoka | A61H 3/008 601/35 |
| 2010/0210980 A1 | 8/2010 | Kudoh | |
| 2010/0254696 A1 | 10/2010 | McKay | |
| 2010/0324699 A1 | 12/2010 | Herr et al. | |
| 2011/0040216 A1 | 2/2011 | Herr et al. | |
| 2011/0105966 A1 | 5/2011 | Kazerooni et al. | |
| 2011/0166489 A1 | 7/2011 | Angold et al. | |
| 2011/0201978 A1 | 8/2011 | Jeon et al. | |
| 2011/0214524 A1 | 9/2011 | Jacobsen et al. | |
| 2011/0264014 A1 | 10/2011 | Angold | |
| 2011/0266323 A1 | 11/2011 | Kazerooni et al. | |
| 2012/0004736 A1 | 1/2012 | Goldfarb et al. | |
| 2012/0172770 A1 | 7/2012 | Almesfer et al. | |
| 2012/0192461 A1 | 8/2012 | Backus | |
| 2012/0283845 A1 | 11/2012 | Herr et al. | |
| 2012/0292361 A1 | 11/2012 | Thiruppathi | |
| 2013/0023800 A1 | 1/2013 | Bédard et al. | |
| 2013/0102935 A1 | 4/2013 | Kazerooni et al. | |
| 2013/0150980 A1 | 6/2013 | Swift et al. | |
| 2013/0197408 A1* | 8/2013 | Goldfarb | A61F 5/0102 601/35 |
| 2013/0231595 A1 | 9/2013 | Zoss et al. | |
| 2013/0237884 A1 | 9/2013 | Kazerooni et al. | |
| 2013/0296746 A1 | 11/2013 | Herr et al. | |
| 2013/0303950 A1 | 11/2013 | Angold et al. | |
| 2013/0331744 A1 | 12/2013 | Kamon | |
| 2014/0046234 A1 | 2/2014 | DeSousa | |
| 2014/0094729 A1 | 4/2014 | Lachance et al. | |
| 2014/0200491 A1 | 7/2014 | Julin et al. | |
| 2014/0276264 A1* | 9/2014 | Caires | A61H 3/00 601/34 |
| 2014/0330431 A1* | 11/2014 | Hollander | B25J 9/0006 700/245 |
| 2014/0358053 A1* | 12/2014 | Triolo | A61H 3/00 602/16 |
| 2015/0001269 A1 | 1/2015 | Sacksteder | |
| 2015/0081036 A1* | 3/2015 | Nakanishi | A61H 1/024 623/24 |
| 2015/0134080 A1 | 5/2015 | Roh | |
| 2015/0173992 A1* | 6/2015 | Wang | A61H 1/02 601/5 |
| 2015/0272809 A1 | 10/2015 | Accoto et al. | |
| 2015/0313786 A1* | 11/2015 | Sano | A61H 3/00 602/16 |
| 2015/0321340 A1 | 11/2015 | Smith | |
| 2015/0366694 A1 | 12/2015 | Bujold et al. | |
| 2016/0015589 A1* | 1/2016 | Lee | A61H 1/0262 602/16 |
| 2016/0016307 A1* | 1/2016 | Choi | A61H 3/00 74/423 |
| 2016/0038313 A1* | 2/2016 | Kim | B25J 9/102 623/24 |
| 2016/0058647 A1 | 3/2016 | Maddry | |
| 2016/0067550 A1 | 3/2016 | Breach et al. | |
| 2016/0184165 A1* | 6/2016 | Ohta | A61H 3/00 623/27 |
| 2016/0262969 A1* | 9/2016 | Ohta | A61H 1/0255 |
| 2017/0014297 A1 | 1/2017 | Grygorowicz et al. | |
| 2017/0061828 A1 | 3/2017 | Artemiadis et al. | |
| 2017/0181917 A1* | 6/2017 | Ohta | A61H 3/008 |
| 2017/0303849 A1 | 10/2017 | De Sapio et al. | |

FOREIGN PATENT DOCUMENTS

| | | |
|---|---|---|
| JP | 2003104682 A | 4/2003 |
| JP | 200911818 A | 1/2009 |
| WO | 2012154580 A1 | 11/2012 |
| WO | 2014159608 A1 | 10/2014 |

OTHER PUBLICATIONS

International Search Report and Written Opinion for International Patent Application No. PCT/US2016/042427, dated Oct. 24, 2016, 18 pages.

Notice of Allowance and Notice Requiring Inventor's Oath or Declaration for U.S. Appl. No. 14/744,892, dated Jul. 5, 2017, 11 pages.

Corrected Notice of Allowance for U.S. Appl. No. 14/744,892, dated Jul. 14, 2017, 7 pages.

Artemiadis, Panagiotis K et al., "EMG-based Position and Force Estimates in Coupled Human-Robot Systems: Towards EMG-controlled Exoskeletons," Experimental Robotics: The Eleventh International Symposium (book), vol. 54, 2009, Springer Berlin Heidelberg, pp. 1-10.

Ferris, Daniel P. et al., "An Ankle-Foot Orthosis Powered by Artificial Muscles," Journal of Applied Biomechanics, vol. 21, Issue 2, May 2005, Human Kinetics, Inc., 3 pages.

Ferris, Dan et al., "An Improved Ankle-Foot Orthosis Powered by Artificial Pneumatic Muscles," XIXth Congress of the International Society of Biomechanics: the human body in motion, Jul. 6-11, 2003, Dunedin, New Zealand, University of Otago, 17 pages.

Ferris, Daniel P. et al., "Development of a myoelectrically controlled lower limb orthosis for human locomotion," Proceedings of the NCMRR Symposium "Medical Rehab on the Move: Spotlight on BioEngineering," Abstract, Jan. 4-5, 2001, Bethesda, Maryland, Supported by NIH AR08602 and U.S. Dept. of Veterans Affairs Center Grant #A0806C, 2 pages.

Gordon, Keith E. et al., "Motor Adaptation During Walking with a Powered Ankle Foot Orthosis," Journal of NeuroEngineering and Rehabilitation, vol. 4, 2007, BioMed Central Ltd, 2 pages.

Kawamoto, Hiroaki et al., "Power Assist Method for HAL-3 using EMG-based Feedback Controller," IEEE International Conference on Systems, Man and Cybernetics, Oct. 8, 2003, IEEE, pp. 1648-1653.

Sawicki, Gregory S. et al., "A Knee-Ankle-Foot Orthosis (KAFO) Powered by Artificial Pneumatic Muscles," XIXth Congress of the

(56) References Cited

OTHER PUBLICATIONS

International Society of Biomechanics: the human body in motion, Jul. 6-11, 2003, Dunedin, New Zealand, 1 page.
Sawicki, Gregory S. et al., "Mechanics and energetics of level walking with powered ankle exoskeletons," The Journal of Experimental Biology, vol. 211, Feb. 19, 2009, The Company of Biologists, pp. 1402-1413.
Non-Final Office Action and Examiner-Initiated Interview Summary for U.S. Appl. No. 14/744,892, dated Feb. 17, 2017, 44 pages.
Supplemental Notice of Allowability for U.S. Appl. No. 13/084,265, dated Jan. 25, 2016, 3 pages.
Notice of Reasons for Refusal for Japanese Patent Application No. 2013-504019, dated Dec. 22, 2015, 6 pages.
Whitwam, Ryan, et al., "Banks now have money-grabbing robotic exoskeletons that are probably helpful for robbing banks," PCMag Digital Group, May 9, 2015, Ziff Davis, LLC, www.geek.com/?s=japanese+banks+now+have+money+grabbing&x=0&y=0, 4 pages.
Non-Final Office Action for U.S. Appl. No. 13/084,265, dated Sep. 10, 2015, 7 pages.
Extended European Search Report for European Patent Application No. 11766862.4, dated May 27, 2014, 4 pages.
Notice of Reasons for Refusal for Japanese Patent Application No. 2013-504019, dated Feb. 24, 2015, 6 pages.
International Search Report for PCT/US2011/031956, dated Jun. 21, 2011, 2 pages.
International Preliminary Report on Patentability for PCT/US2011/031956, dated Oct. 9, 2012, 6 pages.
International Preliminary Report on Patentability for PCT/US2016/042427, dated Jan. 23, 2018, 13 pages.
Non-Final Office Action for U.S. Appl. No. 15/181,934, dated Mar. 27, 2018, 17 pages.
Notice of Allowance for U.S. Appl. No. 15/371,709, dated Jul. 13, 2018, 10 pages.
International Search Report and Written Opinion for International Patent Application No. PCT/US2018/032940, dated Sep. 12, 2018, 17 pages.
Final Office Action for U.S. Appl. No. 15/181,934, dated Oct. 31, 2018, 22 pages.
Non-Final Office Action for U.S. Appl. No. 15/359,806, dated Nov. 16, 2018, 12 pages.

\* cited by examiner

VARIABLE FORCE EXOSKELETON HIP JOINT

TECHNICAL FIELD

The embodiments relate to exoskeletons, and in particular to a variable force exoskeleton hip joint.

BACKGROUND

An exoskeleton is often used by an individual to support a workload, such as a tool or other device, directly in front of or behind the individual. An exoskeleton may have a counterbalance mechanism that allows adjustable counterweights to be applied to offset the workload. However, particularly in unpowered exoskeletons, as the individual moves the exoskeleton, the individual must also move the combined weight of the workload and the weight of the counterweights. For relatively heavy workloads, and consequently relatively heavy counterweights, the total amount of weight that must necessarily be manipulated can contribute to user discomfort and can become a safety risk.

SUMMARY

The embodiments relate to a variable force exoskeleton hip joint having a rotation axis. The variable force exoskeleton hip joint includes an adjustable force mechanism that is configured to apply an adjustable force to an upper body link of an upper body exoskeleton with respect to a lower body link of a lower body exoskeleton to hinder rotation of the upper body exoskeleton with respect to the lower body exoskeleton in a rotational direction. Among other advantages, the variable force exoskeleton hip joint counters the weight of an item carried in front of or behind the exoskeleton without a need for counterweights, resulting in a lower weight for a user to manipulate when moving the exoskeleton.

In one embodiment, a system is provided. The system includes a hip joint that includes a rotation axis, and a first member that is rotatable about the rotation axis. The first member has a lower body connection location configured to be coupled to a lower body link. The hip joint further includes a second member rotatable about the rotation axis and having an upper body connection location configured to be coupled to an upper body link. The system includes an adjustable force mechanism coupled to at least one member of the first member and the second member and configured to apply an adjustable force to the at least one member to hinder rotation of the upper body connection location with respect to the lower body connection location in a rotational direction.

In one embodiment, the lower body connection location and the lower body link are integrated with each other, and the upper body connection location and the upper body link are integrated with each other.

In one embodiment, the upper body link is configured to at least partially enclose hips of a user. The upper body link is configured to be, in operation, in a substantially horizontal plane, and the lower body link configured to be, in operation, in a substantially vertical plane.

In one embodiment, the hip joint has a preloaded mode and a non-preloaded mode. In the non-preloaded mode, the upper body connection location is at about a 90 degree orientation with respect to the lower body connection location.

In one embodiment, the adjustable force mechanism comprises a torsion spring that includes a first spring leg rotationally coupled to the first member, a second spring leg rotationally coupled to the second member, and a spring rotation axis that is collinear with the rotation axis. The adjustable force mechanism includes a rotatable ratchet mechanism coupled between the first spring leg and the first member. The rotatable ratchet mechanism is configured to, when rotated, rotate the torsion spring and apply a variable preload to the torsion spring.

In one embodiment, the rotatable ratchet mechanism further comprises a ratchet drum that forms a drum interior void configured to receive the first spring leg, and a stop is positioned in the drum interior void that is configured to limit rotation of the first spring leg. The ratchet drum further comprises a first planar face and a plurality of angled ratchet teeth annularly disposed about the first planar face. The first member includes a second planar face and a plurality of angled pawl teeth annularly disposed about the second planar face. The angled ratchet teeth and angled pawl teeth are configured to allow rotation in a first rotational direction of the angled ratchet teeth with respect to the angled pawl teeth when in contact with one another, and to prohibit rotation in a second rotational direction of the angled ratchet teeth with respect to the angled pawl teeth when in contact with one another.

In one embodiment, the adjustable force mechanism further includes a cup coupled between the torsion spring and the second member. The cup forms a cup interior void configured to receive the second spring leg, and includes a stop positioned in the cup interior void that is configured to limit rotation of the first spring leg. The cup further includes a third planar face and a plurality of extensions extending therefrom. The second member includes a fourth planar face and a plurality of openings configured to receive the plurality of extensions to prevent rotation of the cup with respect to the second member.

In another embodiment, the adjustable force mechanism comprises a rod hingedly coupled to one member of the first member and the second member. An extension spring is coupled to the rod. A disk is coupled to the extension spring and housed in one link of the lower body link and the upper body link. The disk forms a threaded opening. A threaded rod is threadably engaged with the threaded opening. A user-adjustable rotation mechanism is configured to rotate the threaded rod to slide the disk with respect to the one link and thereby apply tension to the extension spring.

In another embodiment, the adjustable force mechanism comprises a rod hingedly coupled to one member of the first member and the second member. An actuator is housed within and fixed with respect to one link of the lower body link and the upper body link. The actuator comprises a motor and an actuator arm. The actuator arm is hingedly coupled to the rod. The motor is configured to selectively extend or retract the actuator arm.

In another embodiment, a system is provided. The system includes a hip joint that has a rotation axis. The system includes a lower body link that is rotatable about the rotation axis. The lower body link has a lower body link hip joint end and a lower body link distal end. The system also includes an upper body link that is rotatable about the rotation axis. The upper body link has an upper body link hip joint end. An adjustable force mechanism is coupled to at least one hip joint end of the lower body link hip joint end and the upper body link hip joint end and configured to apply an adjustable force to the at least one hip joint end to hinder rotation of the upper body link with respect to the lower body link location in a rotational direction.

In another embodiment, an exoskeleton is provided. The exoskeleton includes an upper body exoskeleton that comprises an upper body link. The exoskeleton further includes a lower body exoskeleton that includes a lower body link. The exoskeleton further includes a hip joint that couples the upper body exoskeleton to the lower body exoskeleton. The hip joint includes an adjustable force mechanism that is coupled to at least one body link of the upper body link and the lower body link and is configured to apply an adjustable force to the at least one body link to hinder rotation of the upper body exoskeleton with respect to the lower body exoskeleton in a rotational direction.

Those skilled in the art will appreciate the scope of the disclosure and realize additional aspects thereof after reading the following detailed description of the embodiments in association with the accompanying drawing figures.

BRIEF DESCRIPTION OF THE DRAWINGS

The accompanying drawing figures incorporated in and forming a part of this specification illustrate several aspects of the disclosure, and together with the description serve to explain the principles of the disclosure.

DETAILED DESCRIPTION

The embodiments set forth below represent the information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

The use herein of ordinals in conjunction with an element is solely for distinguishing what might otherwise be similar or identical labels, such as "first member" and "second member" and does not imply a priority, a type, an importance, or other attribute, unless otherwise stated herein. The term "about" used herein in conjunction with a numeric value means any value that is within a range of ten percent greater than or ten percent less than the numeric value.

The embodiments relate to a variable force exoskeleton hip joint having a rotation axis. The variable force exoskeleton hip joint includes an adjustable force mechanism that is configured to apply an adjustable force to an upper body link of an upper body exoskeleton with respect to a lower body link of a lower body exoskeleton to hinder rotation of the upper body exoskeleton with respect to the lower body exoskeleton in a rotational direction. Among other advantages, the variable force exoskeleton hip joint counters the weight of an item carried in front of or behind the exoskeleton without a need for counterweights, resulting in a lower weight for a user to manipulate when moving the exoskeleton.

Figure 1:
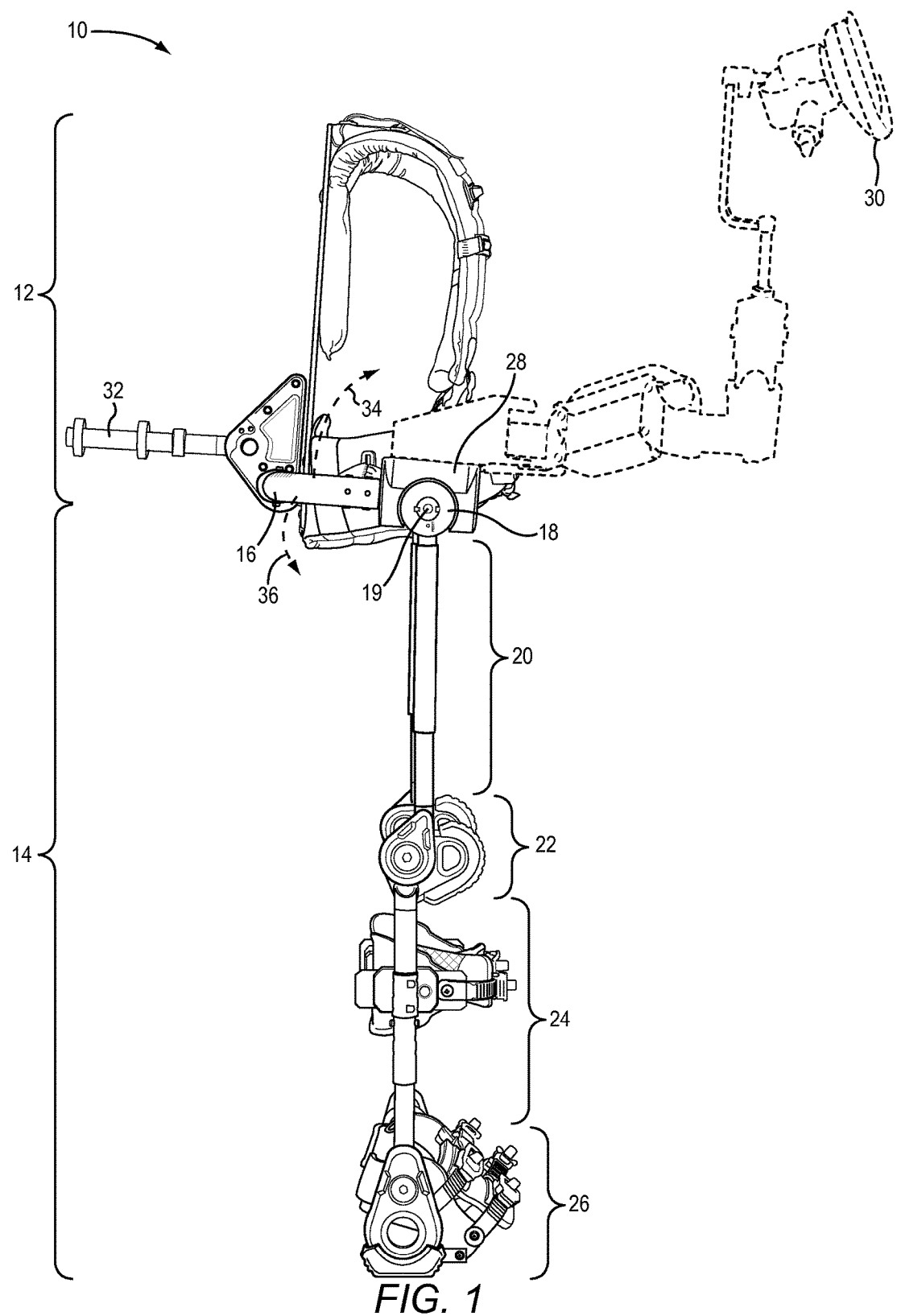
FIG. 1 is a side view of an exoskeleton according to one embodiment.

FIG. 1 is a side view of an exoskeleton 10 according to one embodiment. The exoskeleton 10 includes an upper body exoskeleton 12 and a lower body exoskeleton 14. The upper body exoskeleton 12 includes an upper body link 16, sometimes referred to as a hip arc, that is coupled to a hip joint 18. The hip joint 18 includes a rotation axis 19 that is perpendicular to a sagittal plane of a user about which the upper body link 16, and the upper body exoskeleton 12, can at least partially rotate. In the orientation illustrated in FIG. 1, the lower portion of the upper body exoskeleton 12 includes the upper body link 16, and the lower body exoskeleton 14 is that portion of the exoskeleton 10 that is below the upper body link 16. The upper body link 16 at least partially encloses the hips of the user (not illustrated for purposes of clarity) and, in operation, is generally in a substantially horizontal plane.

The hip joint 18 is also coupled to a lower body link 20 of the lower body exoskeleton 14. The lower body link 20, in this example, is a thigh link, but in other embodiments, the lower body link 20 may a pelvic link. The lower body link 20, in the orientation illustrated in FIG. 1, in operation is generally in a vertical plane. The lower body link 20 and the lower body exoskeleton 14 can at least partially rotate in the sagittal plane about the rotation axis 19 of the hip joint 18.

In this embodiment, the lower body exoskeleton 14 includes a knee joint 22. The knee joint 22 is also connected to a calf link 24 that extends a distance along a calf of the user, and terminates at or near a floor. In some embodiments, the calf link 24 may terminate in a foot rocker 26 that, in operation, contacts the floor. In some embodiments, the foot rocker 26 comprises a foot link, which is positioned under a foot of the user.

The exoskeleton 10 may also include a tool assembly connector 28 that is configured to support a tool 30 for operation by the user. The tool assembly connector 28, in this example, is illustrated as being integrated with the hip joint 18. The weight of the tool 30 creates a moment of force about the rotation axis 19. In conventional exoskeletons, this moment of force is countered by placing one or more weights on a weight extension 32 that is coupled to the upper body link 16. Heavy tools 30 require heavy weights on the weight extension 32, can make the exoskeleton 10 difficult to manipulate for the user, and in some circumstances may become a safety concern.

As will be discussed in greater detail below, the hip joint 18 may reduce or eliminate the need for weights by allowing the user to manipulate a user adjustable force mechanism of the hip joint 18 to hinder rotation of the upper body link 16 about the rotation axis 19 with respect to the lower body link 20 in a rotational direction 34. In other embodiments, for example in an exoskeleton wherein the user carries a workload on a back portion of the upper body exoskeleton 12, the hip joint 18 may be arranged to hinder rotation of the upper body link 16 about the rotation axis 19 with respect to the lower body link 20 in a rotational direction 36.

Figure 2:
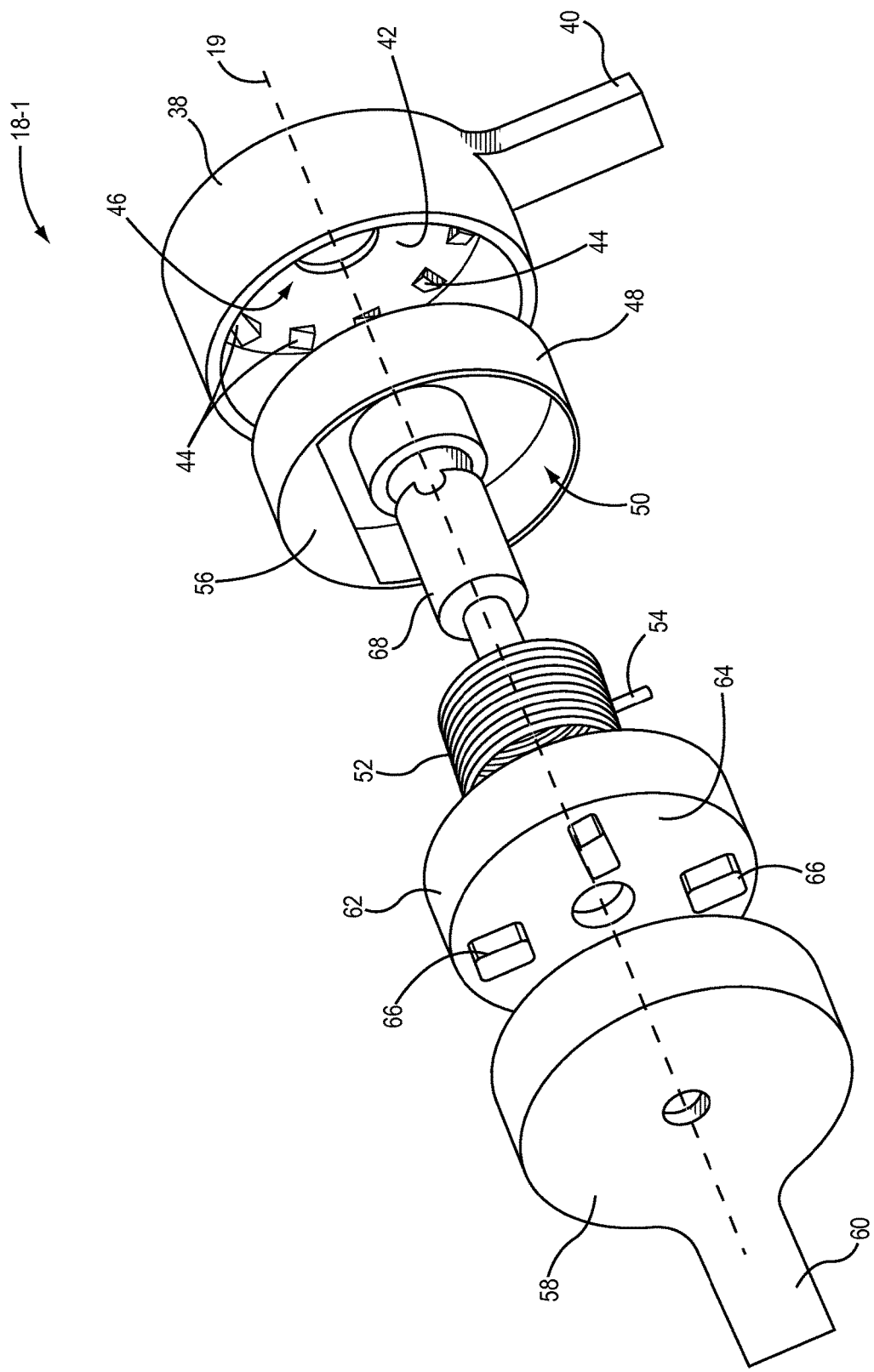
FIG. 2 is a first exploded view of a hip joint according to one embodiment.

FIG. 2 is a first exploded view of a hip joint 18-1 comprising an adjustable force mechanism according to one embodiment. The hip joint 18-1 has the rotation axis 19 about which a first member 38 rotates. The first member 38 has a cup shape, and a lower body connection location 40 for connection or direct coupling with the lower body link 20 (FIG. 1). In some embodiments, the lower body connection location 40 and the lower body link 20 are integrated with one another and formed together during manufacturing. In other embodiments, the lower body connection location 40 is separate from the lower body link 20 and is subsequently coupled to the lower body link 20 after manufacture.

The first member 38 comprises a planar face 42 on which a plurality of angled pawl teeth 44 are annularly disposed. The first member 38 forms a void 46 in which a ratchet drum 48 resides. The ratchet drum 48 forms a void 50 configured to receive a portion of a torsion spring 52 and a first spring leg 54. The torsion spring 52 has a rotation axis that is collinear with the rotation axis 19. The first spring leg 54 is rotationally coupled to the first member 38 via the ratchet drum 48 to thereby impart torque upon the first member 38 when twisted. A stop 56 is positioned or otherwise formed in the void 50 and is configured to limit rotation of the first spring leg 54 in the void 50. A second member 58 also rotates about the rotation axis 19. The second member 58 has a cup shape, and an upper body connection location 60 for connection or direct coupling with the upper body link 16 (FIG. 1). In some embodiments, the upper body connection location 60 and the upper body link 16 are integrated with one another, and formed together during manufacturing. In other embodiments, the upper body connection location 60 is separate from the upper body link 16 and is subsequently coupled to the upper body link 16 after manufacture.

The second member 58 forms an interior void (illustrated in FIG. 3) in which a cup 62 is positioned. The cup 62 includes a planar face 64 and a plurality of extensions 66 extending therefrom.

The first member 38, ratchet drum 48, torsion spring 52, cup 62 and second member 58 each form respective openings in which a shaft 68 is positioned, and about which the various components can at least partially rotate.

Figure 3:
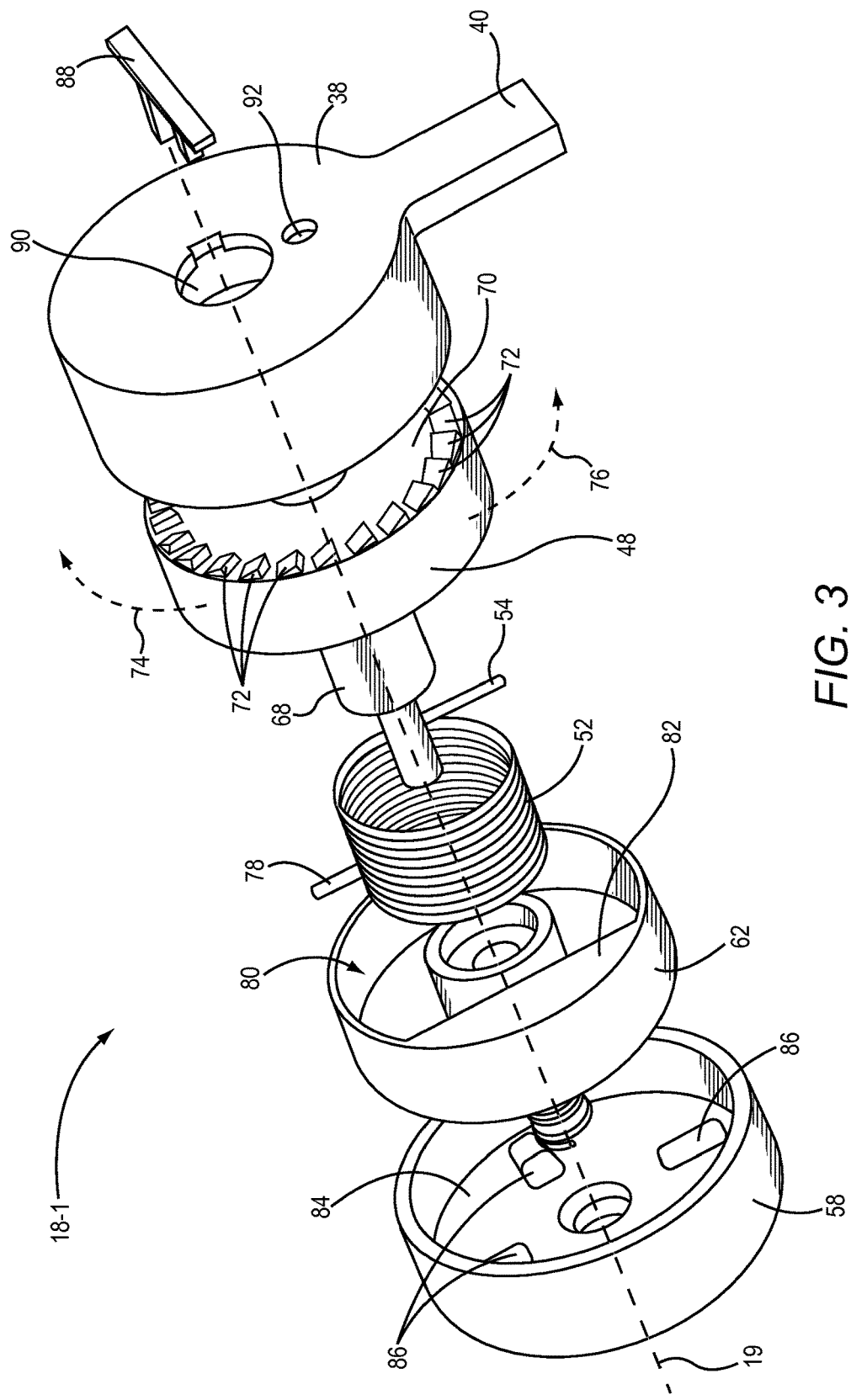
FIG. 3 is a second exploded view of the hip joint illustrated in FIG. 2.

FIG. 3 is a second exploded view of the hip joint 18-1. The ratchet drum 48 includes a planar face 70 on which a plurality of angled ratchet teeth 72 are disposed. The angled ratchet teeth 72 and angled pawl teeth 44 (FIG. 2) are configured to allow rotation in a first rotational direction 74 of the angled ratchet teeth 72 with respect to the angled pawl teeth 44 when in contact with one another, and to prohibit rotation in a second rotational direction 76 of the angled ratchet teeth 72 with respect to the angled pawl teeth 44 when in contact with one another.

The cup 62 is coupled between the torsion spring 52 and the second member 58. The cup 62 forms an interior void 80 configured to receive a second spring leg 78 of the torsion spring 52, and a stop 82 positioned in the interior void 80 configured to limit rotation of the second spring leg 78. The second spring leg 78 is rotationally coupled to the second member 58 via the cup 62 to thereby impart torque upon the second member 58 when twisted. The second member 58 has a planar face 84 and a plurality of openings 86 configured to receive the plurality of extensions 66 (FIG. 2) to prevent rotation of the cup 62 with respect to the second member 58.

In operation, a tool, such as a key 88, may be inserted into a slotted opening 90, and be rotated, which in turn rotates the ratchet drum 48. As the ratchet drum 48 rotates, the torsion spring 52 rotates, increasing the torsional force imparted by the torsion spring 52. When a desired amount of pre-loaded torsional force is generated, the key 88 may be withdrawn, and the ratchet drum 48 is prevented from rotating in the second rotational direction 76 by the pawl teeth 44. Thus, an adjustable force may be applied to the first member 38 and the second member 58 to inhibit rotation of the first member 38 and the second member 58 in a particular rotational direction. The amount of torsional force provided differs depending on the pre-loaded torsional force, and upon characteristics of the torsion spring 52. For applications wherein relatively heavy tools 30 may be used, a relatively thick torsion spring 52 that can apply relatively high torsional forces may be utilized in the hip joint 18-1.

In operation, if it is desired that the adjustable force be eliminated, an elongated tool (not illustrated) may be inserted into a release opening 92 to disengage the ratchet teeth 72 from the pawl teeth 44, and thereby allow the torsion spring 52 to rapidly unwind.

Figure 4:
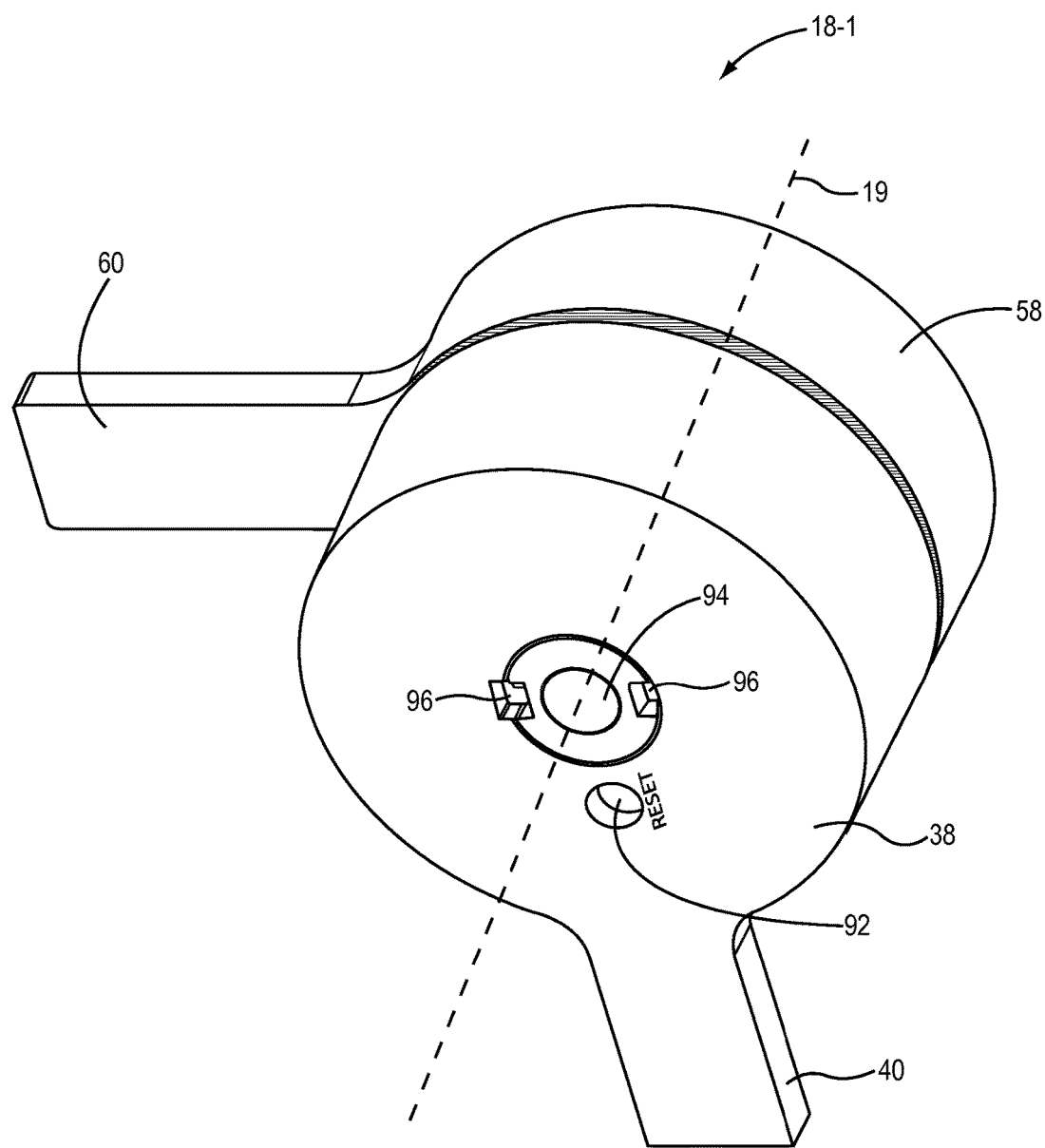
FIG. 4 is a perspective few of the hip joint in an operational state according to one embodiment.

FIG. 4 is a perspective view of the hip joint 18-1 in an operational state according to one embodiment. A bolt 94 or other structure holds the hip joint 18-1 together. When a tool 30 is coupled to the exoskeleton 10, the key 88 (FIG. 3) or other tool may be inserted into slots 96 to variably adjust the rotational forces provided by the hip joint 18-1 to counter the weight of the tool 30. When the tool 30 is removed from the exoskeleton 10, an elongated tool (not illustrated) may be inserted into the release opening 92 to disengage the ratchet teeth 72 from the pawl teeth 44, and thereby allow the torsion spring 52 to rapidly unwind, such that the hip joint 18-1 provides no rotation force.

In one embodiment, the hip joint 18-1 has a preloaded mode and a non-preloaded mode. In the non-preloaded mode, the upper body connection location 60 is at about a 90 degree orientation with respect to the lower body connection location 40.

Figure 5:
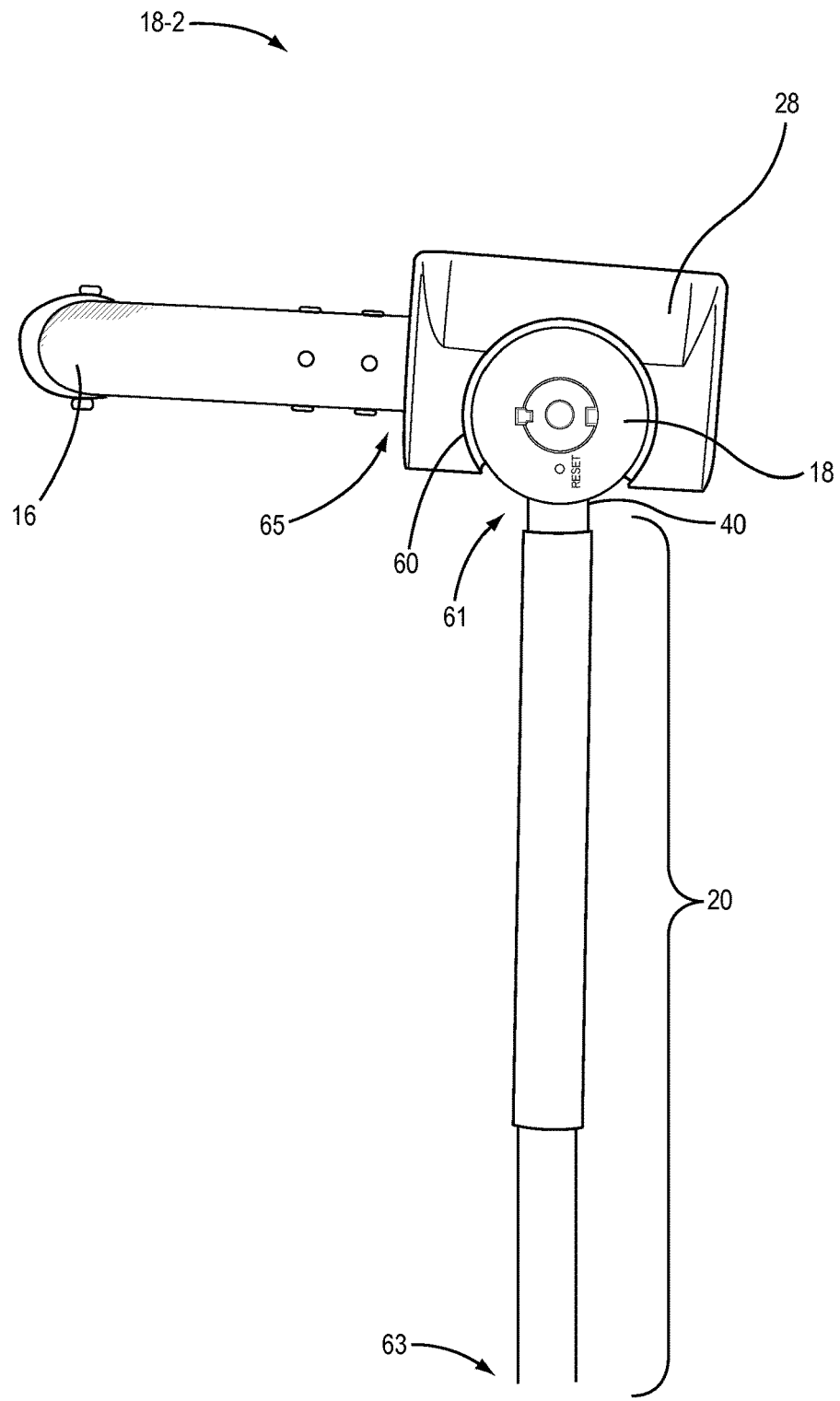
FIG. 5 is a diagram of the hip joint illustrated in FIGS. 3 and 4 wherein the hip joint is integrated with a lower body link and an upper body link during manufacturing.

FIG. 5 is a diagram of a hip joint 18-2 wherein the hip joint 18-2 is integrated with the lower body link 20 and the upper body link 16 during manufacturing. The lower body link 20 is at least partially rotatable about the rotation axis 19 (FIG. 4), and includes a lower body link hip joint end 61 and a lower body link distal end 63. The upper body link 16 is also at least partially rotatable about the rotation axis 19. The upper body link 16 has an upper body link hip joint end 65. The hip joint 18-2 is otherwise identical to the hip joint 18-1 as discussed above.

Figure 6:
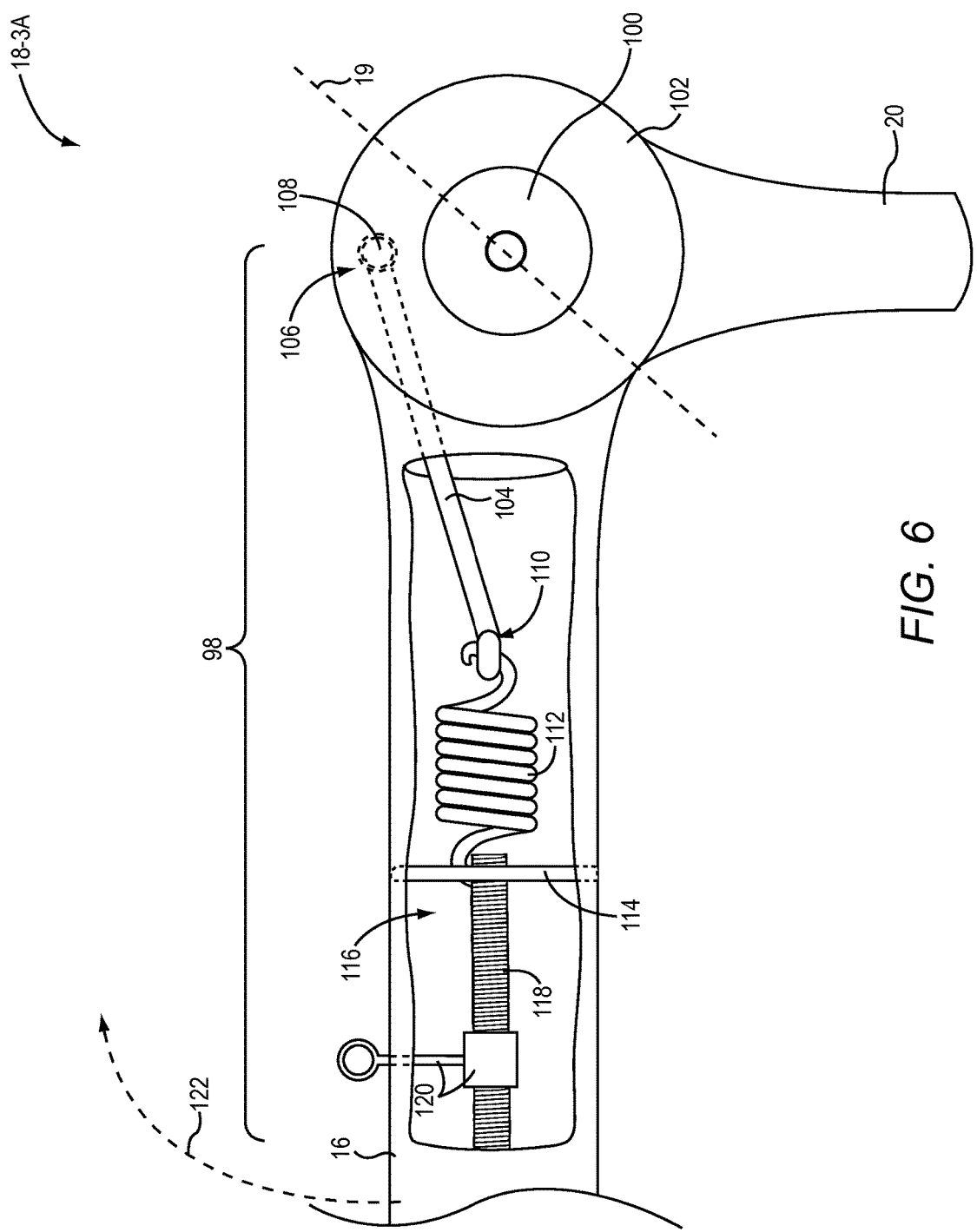
FIG. 6 illustrates a hip joint according to another embodiment.

FIG. 6 illustrates a hip joint 18-3A according to another embodiment. The tool assembly connector 28 is not illustrated for purposes of clarity. In this embodiment, parts of an adjustable force mechanism 98 are housed in either the upper body link 16 or the lower body link 20. In this embodiment, the upper body link 16 includes a shaft 100. The lower body link 20 includes a ring member 102 that is fixed with respect to the lower body link 20 and that is capable of at least partial rotation about the shaft 100.

A rod 104 is coupled at one end 106 to the ring member 102 via a hinge 108. Another end 110 of the rod 104 is coupled to an extension spring 112. The extension spring 112 is also coupled to a disk 114 that has a perimeter shaped to fit snugly within a chamber 116 of the upper body link 16, but is capable of movement along a longitudinal axis of the upper body link 16. The disk 114 forms a threaded opening that receives a threaded rod 118. A rotation mechanism 120 is configured to rotate the threaded rod 118 to slide the disk 114 with respect to the upper body link 16 and thereby apply tension to the extension spring 112. Increases in tension of the extension spring 112 increase the amount of force necessary to rotate the upper body link 16 with respect to the lower body link 20 in a rotational direction 122.

In one embodiment, the rotation mechanism 120 comprises a ratchet and pawl mechanism, and includes a user-selectable quick release mechanism which, when activated, allows the extension spring 112 to rapidly return to a non-tensioned state.

While for purposes of illustration the adjustable force mechanism 98 is depicted as being housed in the upper body link 16, it will be apparent that the adjustable force mechanism 98 could alternatively be housed in the lower body link 20. In such embodiment, the lower body link 20 may include the shaft 100, and the upper body link may include the ring member 102.

Figure 7:
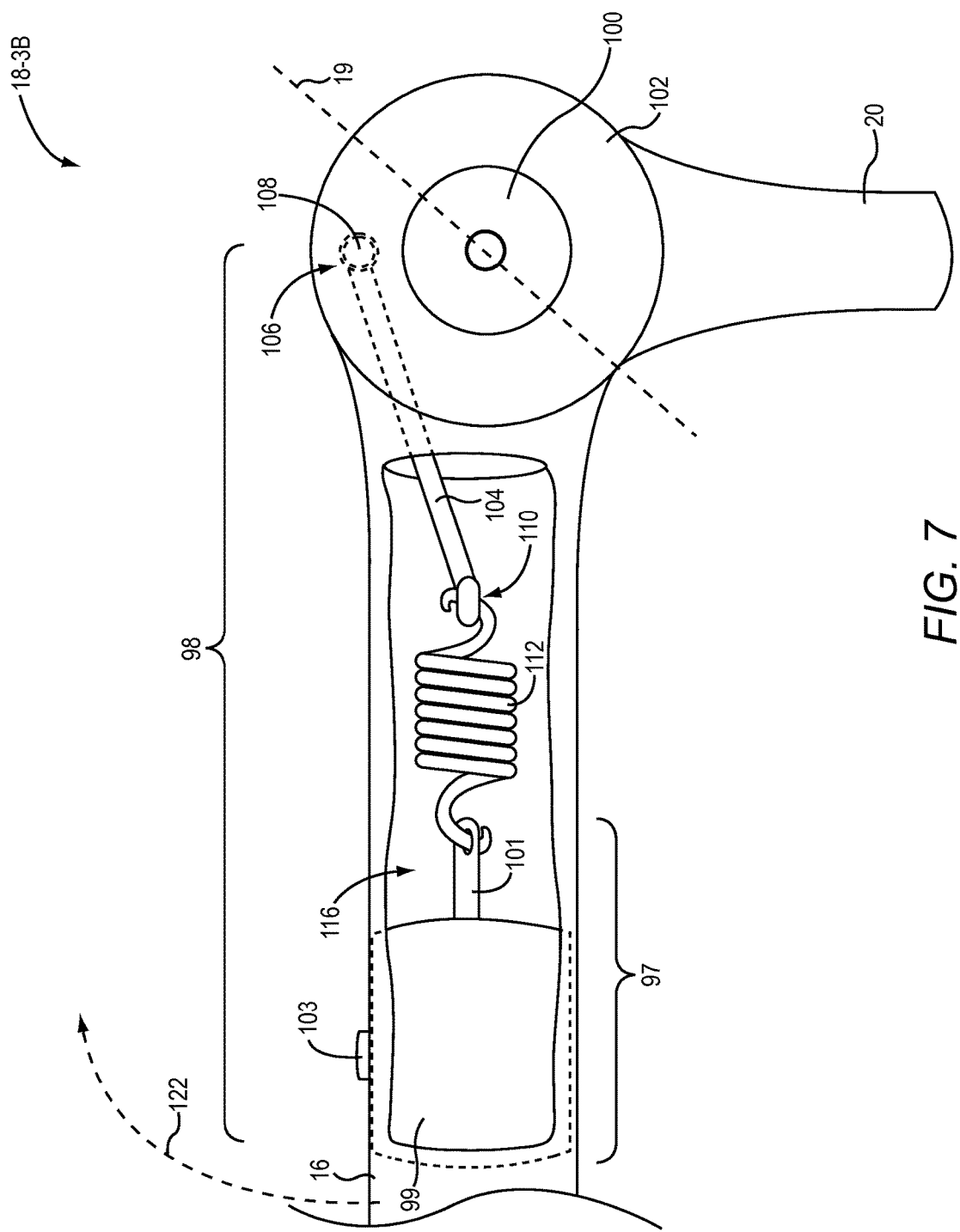
FIG. 7 illustrates a hip joint according to another embodiment.

FIG. 7 illustrates a hip joint 18-3B according to another embodiment. The hip joint 18-3B is substantially similar to the hip joint 18-3A illustrated in FIG. 6, except that the hip joint 18-3B includes an actuator 97. The actuator 97 includes an actuator motor 99 and an actuator arm 101. The motor 99 is housed within and fixed with respect to the upper body link 16. The motor 99 is configured to selectively extend or retract the actuator arm 101 in response to actuation of a switch 103 by the user. The position of the actuator arm 101 determines the force imparted upon the ring member 102 via the rod 104 and the extension spring 112.

Figure 8:
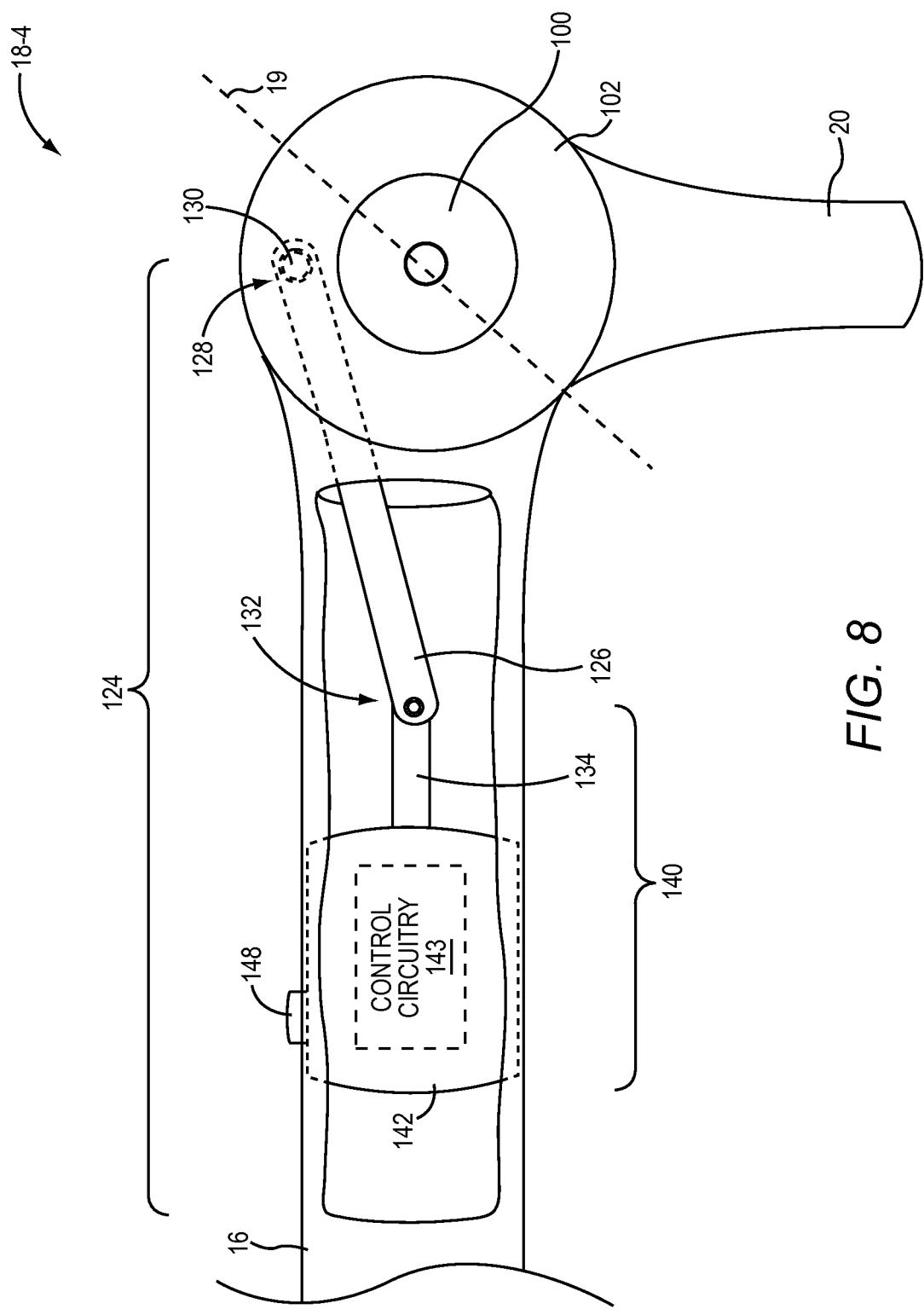
FIG. 8 illustrates a hip joint according to another embodiment.

FIG. 8 illustrates a hip joint 18-4 according to another embodiment. The tool assembly connector 28 is not illustrated for purposes of clarity. In this embodiment, parts of an adjustable force mechanism 124 are housed in either the upper body link 16 or the lower body link 20. In this embodiment, the upper body link 16 includes the shaft 100. The lower body link 20 includes the ring member 102 that is fixed with respect to the lower body link 20 and that is capable of at least partial rotation about the shaft 100.

A rod 126 is coupled at one end 128 to the ring member 102 via a hinge 130. Another end 132 of the rod 126 is hingedly coupled to an actuator arm 134 of an actuator 140. The actuator 140 includes a motor 142. The motor 142 is housed within and fixed with respect to the upper body link 16. The motor 142 is configured to selectively extend or retract the actuator arm 134. The position of the actuator arm 134 determines the relative location of the upper body link 16 with respect to the lower body link 20. In one embodiment, once set in a desired position, the actuator arm 134 maintains the relative location of the upper body link 16 with respect to the lower body link 20 in a fixed position, thereby preventing rotation of the upper body link 16 with respect to the lower body link 20. In other embodiments, control circuitry 143 allows, upon a predetermined amount of force, controlled lateral movement of the actuator arm 134 to permit rotation of the upper body link 16 with respect to the lower body link 20.

The actuator arm 134 may have a neutral position, such that no force is applied to the ring member 102 and such that the upper body link 16 may rotate unhindered with respect to the lower body link 20. A user-selectable variable switch 148 may allow the user to operate the motor 142 to extend the actuator arm 134 to a desired position, retract the actuator arm 134 to a desired position, or place the actuator arm 134 in the neutral position.

While for purposes of illustration the adjustable force mechanism 124 is depicted as being housed in the upper body link 16, it will be apparent that the adjustable force mechanism 124 could alternatively be housed in the lower body link 20. In such embodiment, the lower body link 20 may include the shaft 100, and the upper body link may include the ring member 102.

Those skilled in the art will recognize improvements and modifications to the preferred embodiments of the disclosure. All such improvements and modifications are considered within the scope of the concepts disclosed herein and the claims that follow.

What is claimed is:

1. A system comprising:
   a hip joint comprising:
      a rotation axis;
      a first member rotatable about the rotation axis and having a lower body connection location configured to be coupled to a lower body link;
      a second member rotatable about the rotation axis and having an upper body connection location configured to be coupled to an upper body link; and
      an adjustable force mechanism coupled to at least one member of the first member and the second member and configured to apply an adjustable force to the at least one member to hinder rotation of the upper body connection location with respect to the lower body connection location in a rotational direction, the adjustable force mechanism comprising an actuator housed within and fixed with respect to one body link of the lower body link and the upper body link.

2. The system of claim 1, further comprising:
   a lower body link; and
   an upper body link.

3. The system of claim 2, wherein the lower body connection location and the lower body link are integrated with each other.

4. The system of claim 3, wherein the upper body connection location and the upper body link are integrated with each other.

5. The system of claim 4, wherein the upper body link is configured to at least partially enclose hips of a user, the upper body link configured to be, in operation, in a substantially horizontal plane, and the lower body link configured to be, in operation, in a substantially vertical plane.

6. The system of claim 1, wherein the hip joint has a preloaded mode and a non-preloaded mode, and wherein in the non-preloaded mode the upper body connection location is at about a 90 degree orientation with respect to the lower body connection location.

7. The system of claim 1, wherein the adjustable force mechanism comprises:
   a torsion spring comprising:
      a first spring leg rotationally coupled to the first member;
      a second spring leg rotationally coupled to the second member; and
      a spring rotation axis that is collinear with the rotation axis; and
   a rotatable ratchet mechanism coupled between the first spring leg and the first member, the rotatable ratchet mechanism configured to, when rotated, rotate the torsion spring and apply a variable preload to the torsion spring.

8. The system of claim 7, the rotatable ratchet mechanism further comprising a ratchet drum that forms a drum interior void configured to receive the first spring leg, a stop positioned in the drum interior void configured to limit rotation of the first spring leg, the ratchet drum further comprising a first planar face and a plurality of angled ratchet teeth annularly disposed about the first planar face;
   the first member further comprising a second planar face and a plurality of angled pawl teeth annularly disposed about the second planar face; and
   the angled ratchet teeth and the angled pawl teeth configured to allow rotation in a first rotational direction of the angled ratchet teeth with respect to the angled pawl teeth when in contact with one another, and to prohibit rotation in a second rotational direction of the angled ratchet teeth with respect to the angled pawl teeth when in contact with one another.

9. The system of claim 8, wherein the adjustable force mechanism further comprises a cup coupled between the torsion spring and the second member, the cup forming a cup interior void configured to receive the second spring leg, a stop positioned in the cup interior void configured to limit rotation of the first spring leg, the cup further comprising a third planar face and a plurality of extensions extending therefrom; and
the second member further comprising a fourth planar face and a plurality of openings configured to receive the plurality of extensions to prevent rotation of the cup with respect to the second member.

10. The system of claim 1, wherein the adjustable force mechanism comprises:
a rod hingedly coupled to one member of the first member and the second member;
an extension spring coupled to the rod;
a disk coupled to the extension spring and housed in one link of the lower body link and the upper body link, the disk forming a threaded opening;
a threaded rod threadably engaged with the threaded opening; and
a user-adjustable rotation mechanism configured to rotate the threaded rod to slide the disk with respect to the one link and thereby apply tension to the extension spring.

11. The system of claim 10, wherein the user-adjustable rotation mechanism comprises a ratchet and pawl mechanism.

12. The system of claim 11, wherein the user-adjustable rotation mechanism comprises a user-selectable quick release mechanism which, when activated, allows the extension spring to return to a non-tensioned state.

13. The system of claim 10, wherein the one member comprises the first member and the one link comprises the upper body link.

14. The system of claim 10, wherein the one member comprises the second member and the one link comprises the lower body link.

15. The system of claim 1, wherein the adjustable force mechanism further comprises:
a rod hingedly coupled to one member of the first member and the second member;
an extension spring coupled to the rod; and
wherein the actuator comprises a motor and an actuator arm, the motor configured to selectively extend or retract the actuator arm, the actuator arm being coupled to the extension spring.

16. The system of claim 1, wherein the adjustable force mechanism comprises:
a rod hingedly coupled to one member of the first member and the second member; and
an actuator housed within and fixed with respect to one link of the lower body link and the upper body link, the actuator comprising a motor and an actuator arm, the motor configured to selectively extend or retract the actuator arm, and the actuator arm hingedly coupled to the rod.

17. The system of claim 16, wherein the adjustable force mechanism further comprises:
a user-selectable switch coupled to the actuator.

18. A system comprising:
a hip joint comprising:
a rotation axis;
a lower body link rotatable about the rotation axis, the lower body link having a lower body link hip joint end and a lower body link distal end;
an upper body link rotatable about the rotation axis, the upper body link having an upper body link hip joint end; and
an adjustable force mechanism coupled to at least one hip joint end of the lower body link hip joint end and the upper body link hip joint end and configured to apply an adjustable force to the at least one hip joint end to hinder rotation of the upper body link with respect to the lower body link in a rotational direction, the adjustable force mechanism comprising an actuator housed within and fixed with respect to one body link of the lower body link and the upper body link.

19. The system of claim 18, wherein the upper body link comprises a second upper body link hip joint end and is configured to at least partially enclose hips of a user, the upper body link configured to be, in operation, in a substantially horizontal plane, and the lower body link configured to be, in operation, in a substantially vertical plane.

20. The system of claim 18 wherein the adjustable force mechanism further comprises:
a rod hingedly coupled to one body link of the lower body link and the upper body link;
an extension spring coupled to the rod; and
wherein the actuator comprises a motor and an actuator arm, the motor configured to selectively extend or retract the actuator arm, the actuator arm being coupled to the extension spring.

21. An exoskeleton comprising:
an upper body exoskeleton comprising an upper body link;
a lower body exoskeleton comprising a lower body link; and
a hip joint that couples the upper body exoskeleton to the lower body exoskeleton, the hip joint comprising an adjustable force mechanism coupled to at least one body link of the upper body link and the lower body link and configured to apply an adjustable force to the at least one body link to hinder rotation of the upper body exoskeleton with respect to the lower body exoskeleton in a rotational direction, the adjustable force mechanism comprising an actuator housed within and fixed with respect to one body link of the lower body link and the upper body link.

22. The exoskeleton of claim 21 wherein the hip joint further comprises a tool connection structure configured to couple to a tool assembly that is positioned in front of a user, wherein the upper body link is configured to encircle a back of the user.

23. The exoskeleton of claim 21 wherein the adjustable force mechanism further comprises:
a rod hingedly coupled to one body link of the lower body link and the upper body link;
an extension spring coupled to the rod; and
wherein the actuator comprises a motor and an actuator arm, the motor configured to selectively extend or retract the actuator arm, the actuator arm being coupled to the extension spring.

* * * * *